Feb. 23, 1926.

J. LYDAY

FOUNDRY TRUCK

Filed March 21, 1925    4 Sheets-Sheet 1

Inventor:
John Lyday,
by Lyon Middleton Donaldson & Hall
Attys.

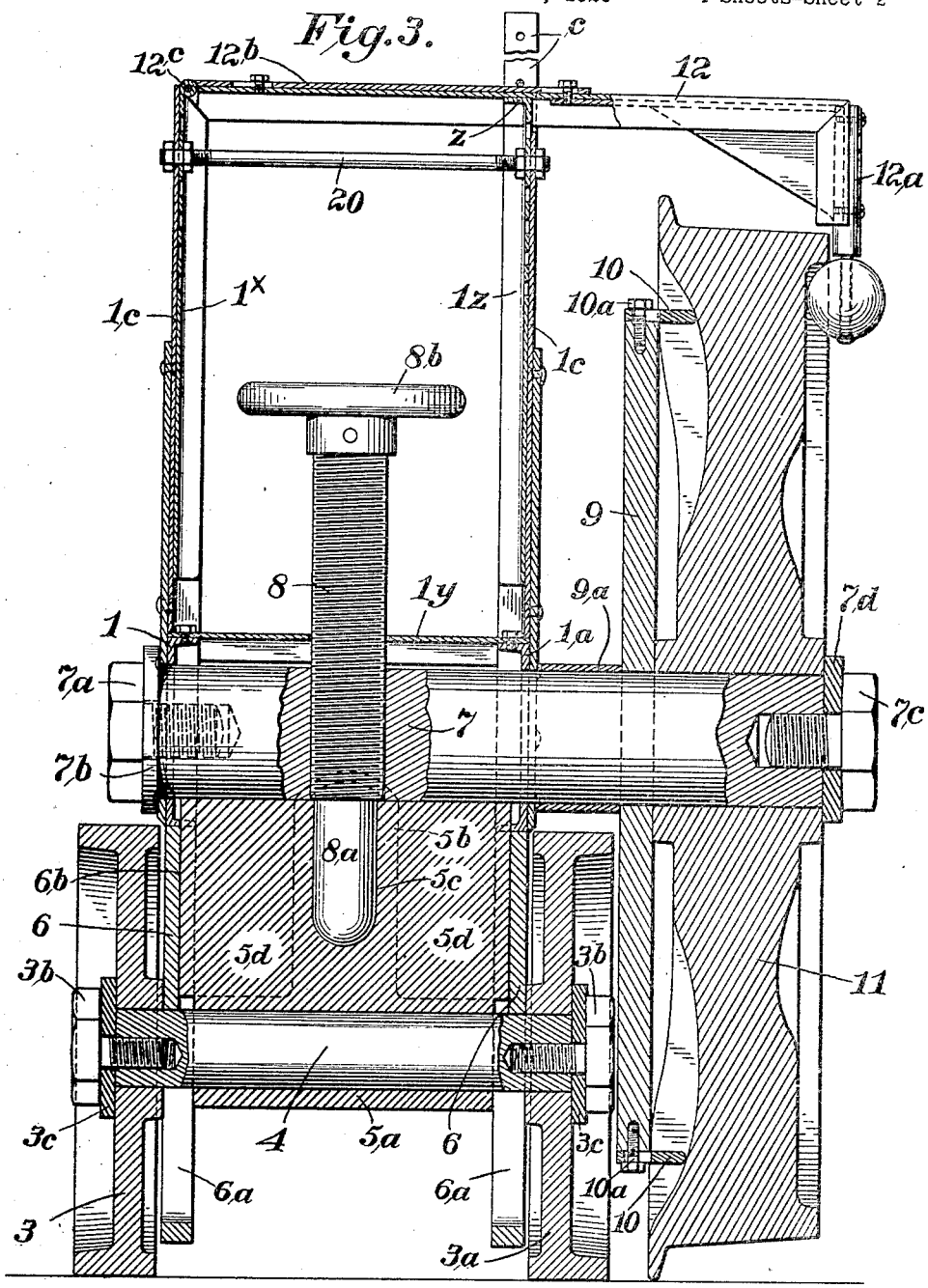

Feb. 23, 1926. 1,573,840
J. LYDAY
FOUNDRY TRUCK
Filed March 21, 1925 4 Sheets-Sheet 3
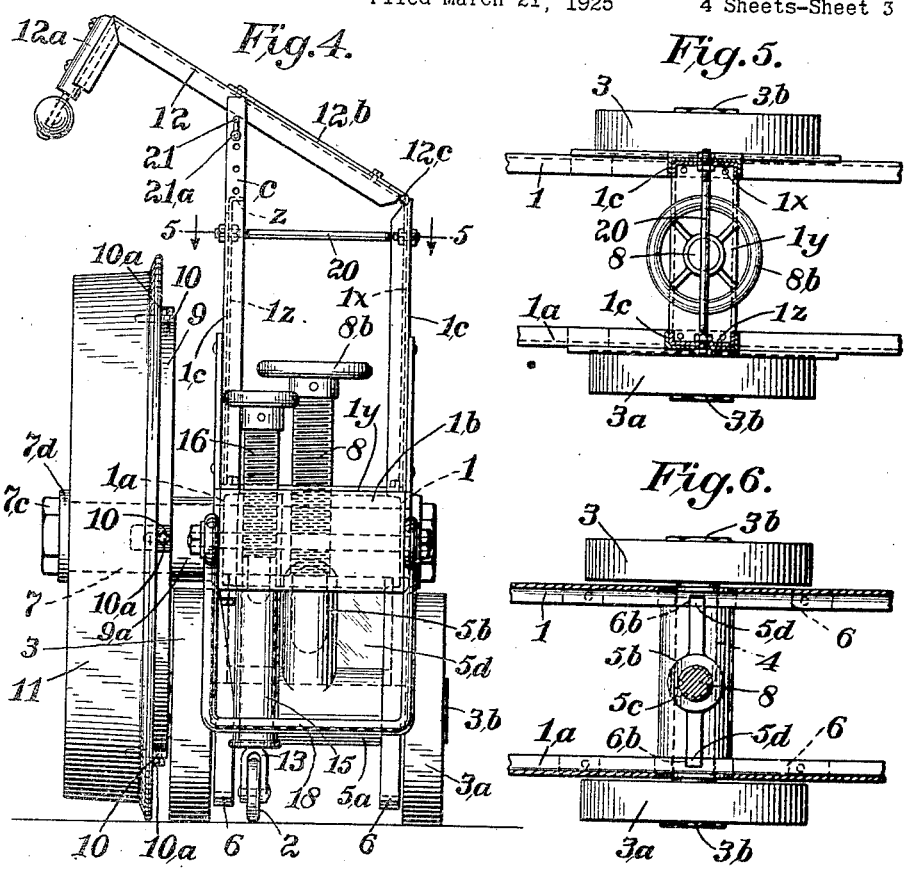
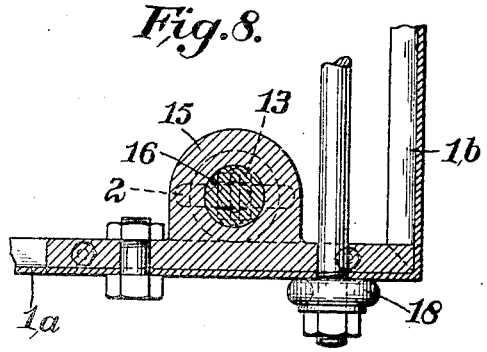
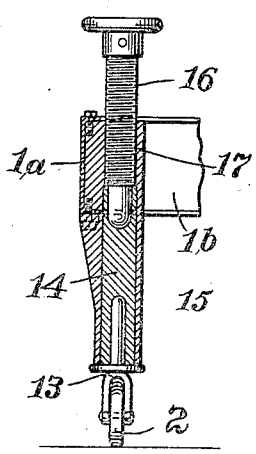
Inventor:
John Lyday,
by Spear Middleton Donaldson & Hall
Attys.

Feb. 23, 1926.

J. LYDAY 1,573,840

FOUNDRY TRUCK

Filed March 21, 1925  4 Sheets-Sheet 4

Inventor:
John Lyday,
by Spear Middleton Donaldson & Hall
Attys.

Patented Feb. 23, 1926.

1,573,840

UNITED STATES PATENT OFFICE.

JOHN LYDAY, OF KANSAS CITY, KANSAS.

FOUNDRY TRUCK.

Application filed March 21, 1925. Serial No. 17,329.

*To all whom it may concern:*

Be it known that I, JOHN LYDAY, a citizen of the United States, and resident of Kansas City, in the county of Wyandotte and State of Kansas, have invented certain new and useful Improvements in Foundry Trucks, of which the following is a specification.

My said invention relates to an improved truck designed for use in foundries for conveying car wheels from one place to another, and aims to provide a simple, economical durable and efficient construction, which is capable of being readily adjusted as to height to accommodate different sized wheels.

The invention further aims to provide a truck to which the car wheel may be readily attached without lifting, and as readily detached, being maintained during this period, on edge, or in a vertical plane, in which position it is capable of being more readily manipulated.

With these and other objects in view, which will hereinafter appear, the invention includes the novel features of construction and arrangement and combination of parts hereinafter described, the nature and scope of the invention being defined by the claims appended hereto.

A truck constructed in accordance with my invention is illustrated in the accompanying drawings, in which—

Fig. 3 is a vertical transverse section on a larger scale.

Fig. 4 is an end elevation and

Fig. 5 is a partial sectional view on line 5—5 of Fig. 4.

Fig. 6 is a similar sectional view midway of the frame members.

Fig. 7 is a sectional detail showing the caster or steering wheel and the manner in which it is connected to the frame.

Fig. 8 is a horizontal section through member 14 of the steering wheel and associated frame parts.

Figure 1:
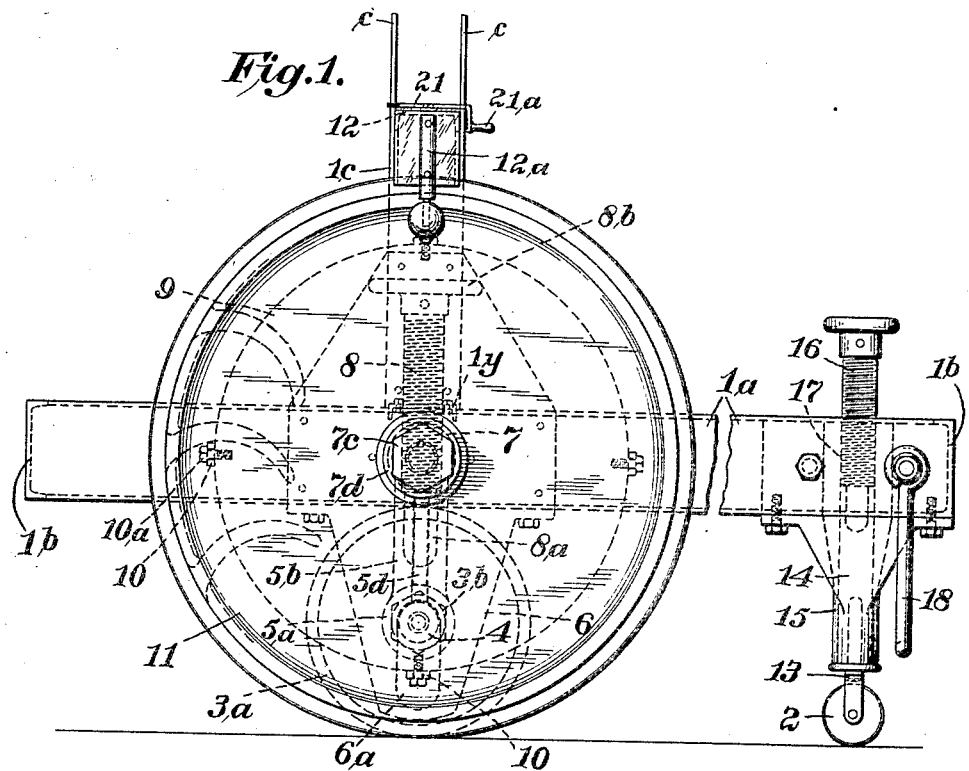
Figure 1 is a side elevation.
Figure 2:
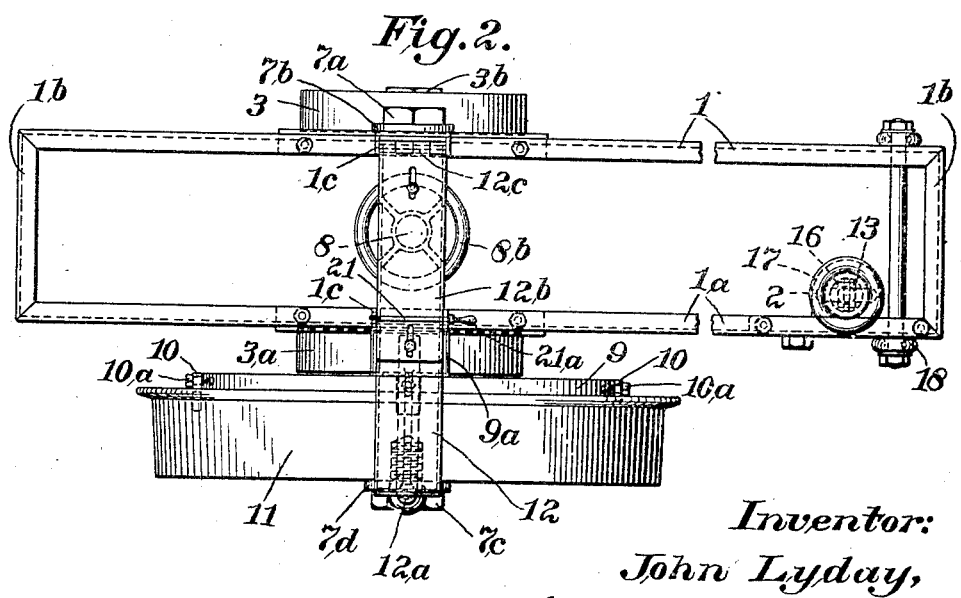
Fig. 2 is a plan view.
Figure 9:
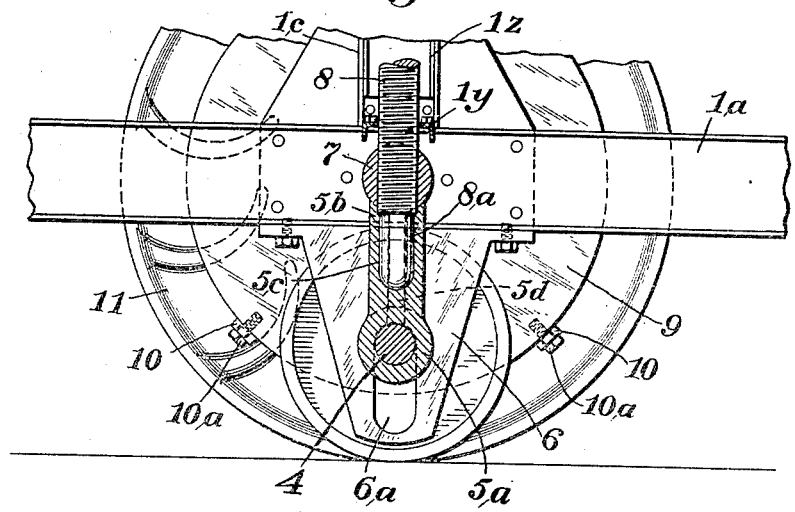
Fig. 9 is a vertical longitudinal section with parts broken away.
Figure 10:
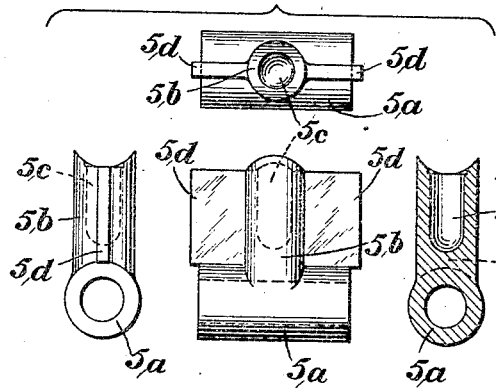
Fig. 10 shows in detail the quill member.
Figure 11:
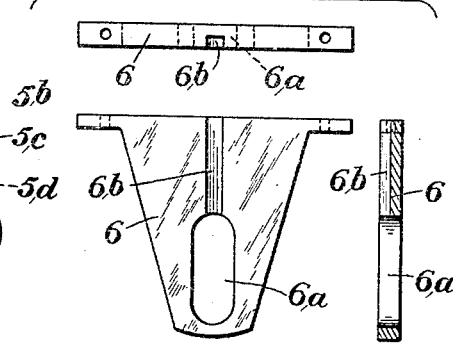
Fig. 11 shows in detail one of the bracket members 6.
Figure 12:
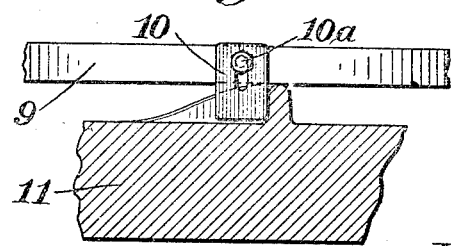
Fig. 12 is a fragmentary detail showing the disc and car wheel with the latter in section.

Referring by reference characters to these drawings, the truck comprises a main frame composed of longitudinal bars or members 1 and $1^a$, united at the ends by transverse members $1^b$, these several members being preferably of channel iron and being united at the ends in any convenient manner, as by welding, to make a strong rigid rectangular frame. This frame is supported at one end (the front) by a wheel 2 of the swivel or caster type, and at points somewhat remote from the rear end by a pair of main carrier wheels 3 and $3^a$ which are rotatably mounted on the ends of the road wheel axle 4 (Fig. 3), being secured thereto by suitable means such as headed bolts $3^b$ tapped into the ends of the axle and interposed washers $3^c$. The axle passes through vertical elongated slots $6^a$ in the brackets 6, which are bolted or otherwise rigidly secured to the bottom flanges of the frame bars 1 and $1^a$. The axle also passes through an elongated tubular or cylindrical passage $5^t$ of what I term a "quill" member, which has a vertical cylindric or enlarged portion $5^b$ provided with a central cylindrical recess $5^c$ with a (preferably) rounded bottom, and laterally extending webs $5^d$ which are projected beyond the ends of the axle carrying part $5^a$, this quill member being preferably formed as in integral whole in any convenient manner, as by casting.

The projecting edges of the webs $5^d$ are slidably seated in vertical guide grooves or channels $6^b$ in the brackets 6.

The upper edge of the quill is concave to fit the lower side of the car wheel carrier axle 7 which passes through a cylindrical opening in the right frame member $1^a$ (Fig. 3) and has its rear end passed through a similar opening in the left frame member 1 and held therein by bolt $7^a$ with interposed washer $7^b$.

To enable the height of the frame and wheel carrier axle to be adjusted vertically to accomodate different sized car wheels, the axle is provided with a vertical screw threaded opening which is engaged by the threads of an adjusting screw 8 having a non-threaded or smooth lower end $8^a$ fitting and rotatably seated in the recess $5^c$, said screw having a hand wheel $8^b$ at its upper end. By rotating the hand screw in a clockwise direction, the wheel carrier axle will be raised and likewise the frame, the weight being borne by the quill and road wheel axle and road wheels through the engagement of the lower end of the screw with the quill recess $5^c$.

The carrier axle 7 carries a disc 9 spaced from the frame by a sleeve $9^a$, to the periphery of which disc I secure a plurality of spaced lugs or abutment members 10 to engage the rear face of the car wheel indicated at 11. These abutments are merely short pieces or bars of iron or steel secured to the disc by tap screws $10^a$. The car wheel may be held to the carrier axle 7 by a bolt $7^c$ with interposed washer $7^d$ and also by the retaining and steadying device $12^b$ carried by the arm 12 which is adjustably carried by bolt and slot connections by the member $12^b$ pivoted at $12^e$ at the upper end of the left hand standard $1^c$ (Fig. 3) members.

By the bolt and slot connection adjustment of retaining or steadying device $12^a$ may be effected for car wheels or different thickness.

Means are provided for raising or lowering the pivot $12^e$ and to this end I form the hinge $12^e$ at the upper end of a bar $1^x$, slidably and adjustably connected to its member $1^c$, both these bars or members being of channel shape in cross section.

Right hand standard $1^e$ (Fig. 3) is also of channel shape in cross section (see Fig. 5) and said channel members are connected at their lower ends by bracing member $1^y$. Cooperating with the right hand channel iron standard $1^e$ (Fig. 3) is a slidable bar $1^z$ of channel shape which has at its upper end a transverse ledge Z for supporting arm 12. The transverse web of said right hand standard $1^e$ is cut away and the side flanges thereof projected upward as indicated at $c$ to provide parallel portions or guides for arm 12.

A cross rod 20 has its ends projected through the aligning openings in the members $1^c$ and $1^x$ and $1^z$ respectively and serves as the means for adjustably connecting said members $1^x$ and $1^z$ to their respective members $1^c$ and also to brace said members, said rod being provided with cooperating pairs of holes $c'$, the holes of one extension being threaded, and said holes being adapted to receive a rod 21 having a threaded end and a crank arm $21^a$ by which the rod may be readily manipulated.

In Figs. 1 and 3 the rod is shown in position to lock the arm 12 in wheel engaging position, while in Fig. 4 it is shown holding the arm 12 elevated.

The guide wheel 2 is journaled in the forked lower end of a spindle 13 which inturn is rotatably mounted in a bearing member 14 which is vertically slidable in a guide 15. A screw 16 engaging a threaded opening in a member 17 carried by the frame member $1^a$, has its lower end rotatably connected with bearing member 14 and by turning the screw the front end of the frame may be raised or lowered as desired.

A bail 18 may be provided for draft purposes.

Having thus described my invention, what I claim is:

1. In combination, a truck frame having suitable supporting wheels, a carrier axle projecting from one side of the frame, and gravity actuated latch means for detachably holding a car wheel thereon.

2. In combination, a truck frame having suitable supporting wheels, a carrier axle projecting from one side of the frame, a disc carried by said axle, abutment members carried by said disc, and means for holding a car wheel on said axle in engagement with said disc.

3. In combination in a truck, supporting wheels, a truck frame, means for adjustably supporting the frame from said wheels, a carrier axle supported by said frame and projecting from one side thereof and beyond the plane of the supporting wheel on that side, and means for detachably connecting a car wheel to said carrier axle.

4. In combination a pair of supporting wheels, a truck frame mounted for adjustment vertically relatively thereto, steering wheel means at one end of the truck, a carrier axle supported by said frame in substantially the same plane as the axis of said supporting wheels, and projecting beyond the plane of one of said wheels, and means for detachably securing a car wheel to said projecting end.

5. In combination, a frame comprising parallel members having aligning openings, a carrier axle seated in said openings and having a wheel carrying part projecting from one side thereof, said carrier axle having a threaded opening vertically therethrough, a quill member, road wheels supporting the same, and an adjusting screw passing through said threaded opening in the carrier axle, and rotatably engaging said quill member.

6. In combination, a frame comprising parallel members having aligning openings, a carrier axle seated in said openings and having a wheel carrying part projecting from one side thereof, said carrier axle having a threaded opening vertically therethrough, brackets depending from said frame members and having elongated openings and vertical guide grooves, a quill member having an axle bearing at its lower end and a central portion provided with a recess, and having also laterally extending webs engaging said guide grooves, a road wheel axle passing through said axle bearing and carrying road wheels, an elevating screw passing through the opening in said carrier axle and engaging the quill recess, and means for detachably connecting a car wheel to said carrier axle.

7. In combination a truck frame having suitable supporting wheels, a carrier axle projecting from one side of the frame, a standard rising from the truck frame, and a latch arm pivotally connected with said standard and having a car wheel engaging part.

8. In combination, a truck frame having suitable supporting wheels, a carrier axle projecting from one side of said frame, a pair of standards rising from the truck frame, vertically adjustable members carried by said standards, and a latch arm pivotally connected to one of said members and having its free portion supported by the other member.

9. In combination a truck frame having suitable supporting wheels, a carrier axle projecting from one side of the frame, a standard rising from the truck frame, and a latch arm pivotally connected with said standard and having a car wheel engaging part, and means for rendering said latch arm capable of lengthwise adjustment.

10. In combination a truck frame having suitable supporting wheels, a carrier axle projecting from one side of said frame, a pair of standards rising from the truck frame, vertically adjustable members carried by said standards, and a latch arm pivotally connected to one of said members and having its free portion supported by the other member, and means associated with said other member for holding said latch arm in either elevated or lowered position.

In testimony whereof, I affix my signature.

JOHN LYDAY.